US006957071B1

(12) United States Patent
Holur et al.

(10) Patent No.: US 6,957,071 B1
(45) Date of Patent: Oct. 18, 2005

(54) METHOD AND SYSTEM FOR MANAGING WIRELESS BANDWIDTH RESOURCES

(75) Inventors: Balaji S. Holur, Plano, TX (US); Ramanamurthy Dantu, Richardson, TX (US); Charles J. Derrick, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 580 days.

(21) Appl. No.: 09/908,348

(22) Filed: Jul. 18, 2001

(51) Int. Cl.[7] .............................................. H04Q 7/20
(52) U.S. Cl. .................. 455/452.2; 455/453; 455/450; 455/452.1; 455/451; 455/509
(58) Field of Search ............................ 455/452.2, 450, 455/453, 13.4, 452.1, 451, 509

(56) References Cited

U.S. PATENT DOCUMENTS

| | | | |
|---|---|---|---|
| 5,586,121 A | 12/1996 | Moura et al. ................ 370/404 |
| 5,610,910 A | 3/1997 | Focsaneanu et al. ........ 370/351 |
| 5,724,659 A * | 3/1998 | Daniel et al. ............ 455/452.2 |
| 5,818,845 A | 10/1998 | Moura et al. ................ 370/449 |
| 5,828,666 A | 10/1998 | Focsaneanu et al. ........ 370/389 |
| 5,991,292 A | 11/1999 | Focsaneanu et al. ........ 370/352 |
| 6,005,580 A | 12/1999 | Donovan ..................... 345/428 |
| 6,075,792 A | 6/2000 | Ozluturk ..................... 370/441 |
| 6,084,866 A * | 7/2000 | Dorenbosch et al. ....... 370/331 |
| 6,097,733 A * | 8/2000 | Basu et al. .................. 370/468 |
| 6,115,370 A | 9/2000 | Struhsaker et al. ......... 370/342 |
| 6,151,309 A * | 11/2000 | Busuioc et al. ............. 370/328 |
| 6,198,929 B1 * | 3/2001 | Krishnamurthi et al. .... 455/439 |
| 6,216,006 B1 * | 4/2001 | Scholefield et al. ........ 455/450 |
| 6,327,254 B1 | 12/2001 | Chuah ......................... 370/328 |
| 6,385,454 B1 * | 5/2002 | Bahl et al. ................... 455/450 |
| 6,452,942 B1 | 9/2002 | Lemieux ..................... 370/468 |
| 6,480,506 B1 * | 11/2002 | Gubbi ......................... 370/468 |
| 6,529,734 B1 * | 3/2003 | Lagneborg et al. ....... 455/452.2 |
| 6,594,245 B1 * | 7/2003 | Rimhagen et al. .......... 370/337 |
| 6,665,537 B1 | 12/2003 | Lioy ............................ 455/435 |
| 6,680,930 B2 * | 1/2004 | Newberg et al. ............ 370/348 |
| 6,721,568 B1 | 4/2004 | Gustavsson et al. ........ 455/450 |
| 6,732,150 B1 * | 5/2004 | Thrane ........................ 709/206 |
| 6,738,350 B1 * | 5/2004 | Gao et al. .................... 370/232 |
| 6,769,000 B1 * | 7/2004 | Akhtar et al. ............ 707/103 R |
| 6,785,252 B1 * | 8/2004 | Zimmerman et al. ....... 370/337 |
| 6,826,160 B1 * | 11/2004 | Wang et al. ................. 370/329 |
| 2001/0004599 A1 * | 6/2001 | Dokko ........................ 455/452 |
| 2001/0043660 A1 * | 11/2001 | Blakeney et al. ........... 375/377 |
| 2002/0072383 A1 * | 6/2002 | Helm et al. ................. 455/509 |
| 2002/0119783 A1 * | 8/2002 | Bourlas et al. ............. 455/453 |
| 2002/0142757 A1 * | 10/2002 | Leung et al. ................ 455/412 |
| 2002/0142777 A1 * | 10/2002 | McGovern et al. ......... 455/450 |

(Continued)

OTHER PUBLICATIONS

Holur, et al., U.S. Appl. No. 10/004,320, filed Oct. 30, 2001, *Method and System for Managing Pushed Data at a Mobile Unit*, 50 pages of Specification, Claims and Abstract and 6 pages of drawings.

(Continued)

*Primary Examiner*—Sonny Trinh
*Assistant Examiner*—Huy Phan
(74) *Attorney, Agent, or Firm*—Baker Botts L.L.P.

(57) ABSTRACT

A method and system for managing wireless bandwidth resources include the capability to receive at a serving node a service request for a mobile unit and to communicate with a wireless network node to determine whether sufficient wireless bandwidth is available for the requested service. The method and system also include the capability to process the service request based on the availability of wireless bandwidth.

42 Claims, 7 Drawing Sheets

U.S. PATENT DOCUMENTS

2003/0040274 A1 * 2/2003 Dai et al. ............... 455/13.4
2003/0087646 A1 * 5/2003 Funato et al. ............ 455/456
2003/0219024 A1 * 11/2003 Purnadi et al. .......... 370/401
2004/0032844 A1 * 2/2004 Lewis et al. ............ 370/338

OTHER PUBLICATIONS

Holur, et al., U.S. Appl. No. 09/771,257, filed Jan. 26, 2001, *Method and System for Providing Service Trigger Management in a Wireless Network.* 45 pages of Specification, Claims and Abstract and 6 pages of drawings.

Holur, et al., U.S. Appl. No. 09/771,205, filed Jan. 26, 2001, *Method and System for Label Edge Routing in a Wireless Network,* 48 pages of Specification, Claims and Abstract and 9 pages of drawings.

TR45, cdma2000 Wireless IP Network Standard, TIA/EIA/IS-835-B, 1-page cover, 8 pages Table of Contents, Figures, Tables and Revision History, and 98 pages of text, Sep. 2002.

Mobile Wireless Internet Forum (mwif), *"Network Reference Architecture Technical Report MTR-004"*, Release 2.0, Contribution Reference No.: MWIF 2001.053.3, 95 pages, Jun. 13, 2003.

Mobile Wireless Internet Forum (mwif), *OpenRAN Architecture in 3rd Generation Mobile Systems*, Technical Report MTR-007, Release v1.0.0, 64 pages, Sep. 4, 2001.

3GPP TS 22.101 6.4.0, *3rd Generation Partnership Project; Technical Specification Group Services and System Aspects Service aspects; Service principles,* Release 6, 45 pages, Jun. 2003.

Xerox PARC, RFC 1256, *"ICMP Router Discovery Messages"*, 18 pages, Sep. 1991.

Wu, et al, RFC 3270, *"Multi-Protocol Label Switching (MPLS) Support of Differentiated Services"*, 57 pages, May 2002.

IBM, RFC 2002, *"IP Mobility Support"*, 71 pages, Oct. 1996.

std005, RFC 791, *"Internet Protocol"*, DARPA Internet Program Protocol Specification, 115 pages, Sep. 1981.

J. Boyle, et al, IPHighway, RFC 2749, *"COPS Usage for RSVP"*, 16 pages, Jan. 2000.

S. Herzog, IPHighway, RFC 2750, *"RSVP Extensions for Policy Control"*, 13 pages, Jan. 2000.

Xerox PARC, RFC 2236, *"Internet Group Management Protocol, Version 2"*, 23 pages, Nov. 1997.

J. Boyle, et al, *"The COPS (Common Open Policy Service) Protocol"*, RFC 2748, 36 pages, Jan. 2000.

3GPP Specifications—Numbering Scheme, http://www.3gpp.org/specs/numbering.htm, 2 pages, May 7, 2003.

* cited by examiner

METHOD AND SYSTEM FOR MANAGING WIRELESS BANDWIDTH RESOURCES

TECHNICAL FIELD OF THE INVENTION

This invention relates generally to the field of wireless communications and, more particularly, to a method and system for managing wireless bandwidth resources.

BACKGROUND OF THE INVENTION

The management of communication systems has become more difficult as the systems have become increasingly larger and more complex. Modern communication systems include wireless devices that are capable of initiating network sessions through serving nodes that couple the wireless devices to a network. Because of this, serving nodes are capable of monitoring a wireless device's communications in order to provide network sessions in accordance with the user's service level agreement with the network service provider.

Traditional methods for providing the appropriate network sessions require the serving node to process payload data in every packet that is destined for the network from a wireless device, in order to verify proper session activity for the user. For example, if a user attempts to access a particular web-site, the serving node retrieves this information from the packet sent by the wireless device. The serving node then checks the user's agreement with the network service provider to determine whether the user is allowed access to the requested web-site. If the user is allowed access, the serving node transmits the packet to the network for further processing. If the user is not allowed access, the serving node may inform the user that access is denied or may request additional access information from the user.

Additionally, traditional methods call for the traffic parameters, such as bandwidth, to be specified apriori in a service level agreement, and, moreover, there is little or no communication between the different elements of the communication system. Thus, there is little flexibility in allocating the bandwidth of a wireless link between different sessions.

SUMMARY OF THE INVENTION

The present invention provides a method and system for managing wireless bandwidth resources that substantially reduce or eliminate disadvantages and problems associated with previously developed systems and methods. Accordingly, in particular embodiments, the present invention provides a method and system capable of dynamically adjusting traffic characteristics for a wireless link by having wireless and wireline systems cooperate and by ensuring that the required radio resources are available before accepting a data service and/or additional data service from a mobile unit.

In some embodiments, a method for managing wireless bandwidth resources includes receiving at a serving node a service request for a mobile unit and communicating with a wireless network node to determine whether sufficient wireless bandwidth is available for the requested service. The method also includes processing the service request based on the availability of wireless bandwidth.

In particular embodiments, a system for managing wireless bandwidth resources includes a plurality of queues at a serving node and a scheduler. The queues store traffic for a session of a mobile unit, the session having at least two services, and the scheduler queues the traffic at the serving node based on a priority of the service.

In certain embodiments, a method for managing wireless bandwidth resources includes determining at a mobile unit that an associated application desires a service and generating a message requesting approval for the service, the message containing traffic characteristics for the service. The method also includes receiving a message regarding approval, determining whether the service is approved, and updating traffic information for a wireless link if the service is approved.

Technical advantages of the present invention include providing dynamic traffic management between the mobile unit and the radio network controller by having the mobile unit cooperate with the radio network controller. This means that there is a closed loop traffic management system, which includes the mobile unit, the base station, and the serving node. As a result, an agent in the serving node may verify session activity, obtain approval from the base station that sufficient radio resources are available to start a data service in a data session or a data session itself, and inform the wireless device, which may then connect to the network as requested. In particular embodiments, the present invention provides mobile assisted traffic link bandwidth optimization.

In certain embodiments, the invention allows queuing of traffic for transport over the wireless link based on available wireless resources and quality of service requirements for the traffic. Accordingly, radio traffic may be prioritized and different services provided on the wireless link.

In particular embodiments, out-of-band messages are communicated between a wireless device and an agent in the serving node when the wireless device is attempting to initiate a network session. Accordingly, the burden on the resources of the serving node with regard to verifying session activity is greatly reduced, freeing those resources to accomplish other tasks. Furthermore, the traffic and the signaling messages do not need to be mixed.

In addition, the wireless device may assist in service request management by tracking previously accepted or rejected services in the wireless device. As a result, the serving node is not required to re-verify a service that has been processed previously. Furthermore, the amount of signaling sent over the air from the wireless device to the serving node with regard to a service request is reduced.

Other technical advantages of the present invention include distributing intelligence about network sessions across the wireless infrastructure and the wireless devices. This reduces processing power required by the wireless infrastructure, which reduces costs for the operator. The intelligence distribution also provides increased flexibility in terms of service management, and allows a user more flexibility in selecting services. As a result, the service provider may obtain increased revenues, while the user may select services in real-time and inform the wireless infrastructure of actions and conditions for the newly selected services.

Additional technical advantages include the ability for the service provider to dynamically set traffic characteristics for the data services in a session. Thus, if a new data service is to be added and insufficient bandwidth exists, the service provider may, consistent with quality of service provisions, degrade the quality of the service or of another data service. Accordingly, this allows a better utilization of resources.

Furthermore, the availability of radio resources may be examined before approving a data service. Thus, advanced information may be used in determining whether to approve a request for a data service.

Other technical advantages will be readily apparent to those skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
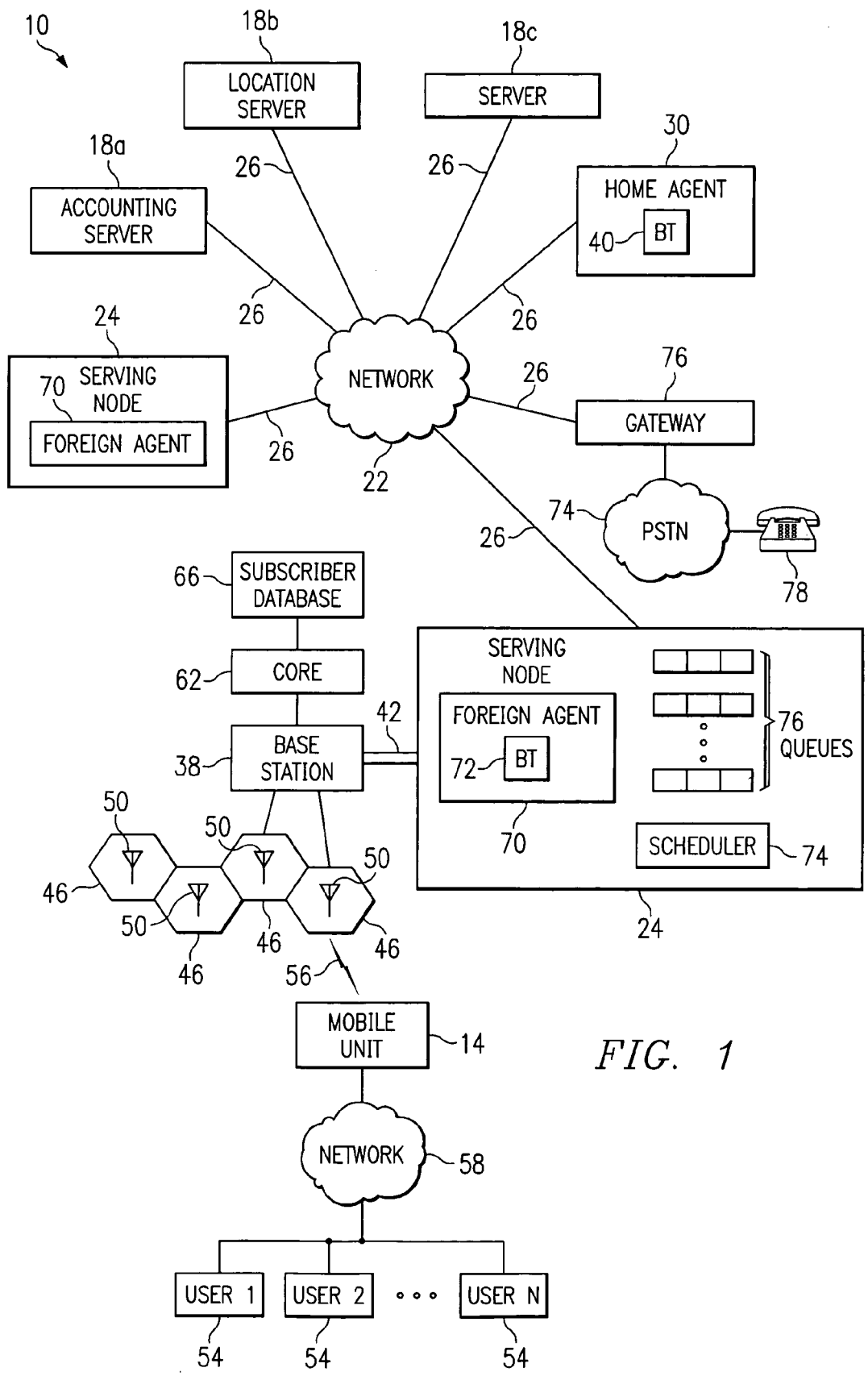
FIG. 1 is a block diagram illustrating a communications system in accordance with one embodiment of the present invention.

FIG. 1 is a block diagram illustrating a communications system 10 in accordance with one embodiment of the present invention. Communications system 10 may transmit voice, audio, video, text, and/or other types of data from one point to another. Communications system 10 includes a mobile unit 14 and a plurality of servers 18 between which data may be transmitted.

Mobile unit 14 may be a wireless telephone, a wireless interface terminal, or other suitable mobile device operable to provide wireless communication in communications system 10. Servers 18 include an accounting server 18a, a location server 18b, and/or any other suitable server 18c for providing services in the communications system 10. Accounting server 18a allows reconciliation between different systems, and location server 18b facilitates location of the mobile unit 14 and advertising to application based servers. In general, system 10 may have any number and/or type of servers.

Mobile unit 14 and servers 18 are coupled to one another and communicate through a network 22, in addition to a wireless infrastructure and a serving node 24. Network 22 may provide this communication over a plurality of communication links 26. Network 22 may be any interconnection found on any computer network such as a wide area network, the Internet, or any other communications and data exchange systems created by connecting two or more computers.

Communication links 26 may be any type of communication link capable of supporting data transfer. In one embodiment, communication links 26 may be, alone or in combination, Integrated Services Digital Network links, Asymmetric Digital Subscriber Line links, T1 or T3 communication lines, hard-wire lines, telephone lines or wireless communication links. It will be understood that communication links 26 may be other suitable types of data communication links. Communication links 26 may also connect to a plurality of intermediate servers between the network 22 and the mobile unit 14 and the servers 18.

Communications system 10 also includes at least one home agent 30 for mobile unit 14, a packet data serving node 24, and a base station 38. Home agent 30 includes a binding table 40 that stores data relating to the mobile unit 14, as described in more detail below. Serving node 24 is coupled to base station 38 through a plurality of radio packet (RP) data switch node links 42 or other suitable links. Each RP link 42 provides a logical path for a mobile unit packet session between the base station 38 and the serving node 24. Servicing node 24 may be any type of device that can receive packets for mobile unit 14 from a data network such as network 22 and forward them toward mobile unit 14.

Base station 38 is operable to provide communication for mobile unit 14 within any of a plurality of cells 46 for that base station 38. As used herein, "each" means every one of at least a subset of the identified items. The mobile unit 14 is operable to communicate with the base station 38 through a transceiver 50 in each cell 46 over a radio frequency (RF) link 56 or other suitable wireless link.

According to one embodiment, the link 56 is an RF link that is based on established technology, such as IS-95 (CDMA), W-CDMA, or CDMA-2000. In a particular embodiment, the link 56 is a code division multiple access (CDMA) link based on a CDMA standard and in which packets are segmented into frames for wireless transmission from the mobile unit 14 to the base station 38 where the frames are re-assembled to reconstitute the packets.

According to the embodiment illustrated in FIG. 1, the mobile unit 14 includes a wireless interface terminal that is operable to host a plurality of users 54. The mobile unit 14 and the users 54 are coupled to one another and communicate through a network 58. Network 58 may itself be a wireless or any other interconnection found on any computer network such as a local area network, a wide area network, the Internet, or any other communications and data exchange systems created by connecting two or more computers.

The system 10 also includes a core control network 62 that is coupled to the base station 38 and a subscriber database 66 that is coupled to the core 62. The core 62 is operable to perform authentication and to set up and disconnect calls for mobile units in cells 46 of the base station 38. The core 62 is also operable to store service level agreements for each user 54 and to provide the agreements to the serving node 24 for service management, traffic management, or other appropriate operations. The core 62 may include a mobile switching center (MSC) that is operable to provide, in conjunction with the base station 38, switch and soft hand-off functionality for the system 10. In this way, voice, video, data, text and other information is routed to and from the mobile unit 14 and connections are maintained with the mobile unit 14 as it moves between cells 46 and between base stations. It will be recognized that system 10 may have multiple base stations serviced by serving node 24, and, furthermore, multiple serving nodes serving multiple base stations. Thus, mobile unit 14 may travel throughout a wide geographic area. Additionally, system 10 may have multiple mobile units such as mobile unit 10 communicating with various devices in the system. The subscriber database 66 stores information relating to mobile unit 14 and/or users 54, such as name, address, account number, account type, and any other suitable information.

Serving node 24 includes a foreign agent 70 that provides communication, through the network 22, between mobile unit 14 and an endpoint. The endpoint may comprise another mobile unit, a standard telephone, a server, or other suitable device. The foreign agent 70 provides functionality similar to the home agent 30 when the mobile unit 14 is out of range for communicating with the home agent 30. The foreign agent 70 includes a binding table 72 that is operable to store data relating to the mobile unit 14.

The serving node also includes queues 76 and a scheduler 74. Queues 76 may be service queues each dedicated to a service and storing data of a micro flow destined for an application at the mobile unit 14. A congestion controller may manage traffic in each service queue based on its priority, such as quality of service (QOS). In one embodiment, traffic is forwarded from a service queue based on wireless bandwidth allocated to the service. The forwarding rate may be controlled as part of the queuing/congestion control process or by the scheduler. Thus, traffic forwarded by the scheduler 74 may be at a rate based on quality of service and/or wireless bandwidth considerations. Accordingly, the serving node may ensure that data is forwarded toward the mobile unit 14 in accordance with service level agreements and/or available bandwidth in the wireless network. Thus, queuing, congestion control, and delay is minimized in the wireless network. The serving node may be a packet data serving node (PDSN).

According to one embodiment, for each mobile unit corresponding to the home agent 30, the binding table 40 includes a mobile unit identifier, a care of address (COA) for the current foreign agent, the internet protocol (IP) address or addresses assigned to the mobile unit, other mobile binding information, and/or any other suitable tunneling characteristics. Similarly, for each mobile unit corresponding to the foreign agent 70, the binding table 72 includes a mobile unit identifier, an address for the home agent, the IP address or addresses assigned to the mobile unit, other mobile information, and any other suitable tunneling characteristics.

Mobile unit 14 and serving node 24 may communicate data and associated addressing information by in-band and/or out-of-band messaging. As used herein, "out-of-band" means communication of data that may be retrieved without inspecting the contents of the payload data of in-band messages. Thus, out-of-band communication provides a mechanism for communicating data in order to implement functions that may be undefined at the time the in-band messaging parameters are determined.

As described in more detail below in connection with FIGS. 2A–C, agent discovery messages, such as agent advertisement messages (AAMs) and agent solicitation messages (ASMs), allow out-of-band communication that enables the mobile unit 14 to determine whether the mobile unit 14 is in communication with its home agent 30 or a foreign agent 70, to determine whether the mobile unit 14 has roamed from one foreign agent 70 to another foreign agent 70, to obtain a COA when in communication with a foreign agent 70, to assist the serving node 24 with service management, to manage bandwidth resources of the wireless link 56, or to provide or obtain any other suitable information.

In addition to being operable to provide communication for mobile units having the ability to communicate out-of-band messages, the serving node 24 is also operable to provide communication for mobile units that are incapable of communicating using out-of-band messages. Thus, for example, while establishing a connection for a mobile unit, the serving node 24 may identify the connection as out-of-band incapable or as out-of-band capable. In this way, the system 10 may support network communication for various types of mobile units.

The network 22 connects a number of servers 18 to each other and to the serving node 24. The network 22 also connects the serving node 24, and thus the mobile unit 14, to the public switched telephone network (PSTN) 74 through a gateway 76. Accordingly, the mobile unit 14 may communicate through serving node 24, the network 22 and the PSTN 74 with standard telephones, clients and computers using modems or digital subscriber line (DSL) connections or other telephony devices 78.

In operation of particular embodiments, when a mobile unit desires a data service, which is usually triggered by the starting of an application at an associated user or at the mobile unit itself, a session is initiated between the mobile unit, the base station, and the serving node. Initiating a session may involve allocating radio resources, establishing an RP session between the base station and the serving node, establishing a data link session between the mobile unit and the serving node, and/or allocating an IP address to the mobile unit. Once the data link is established, the mobile unit uses an out-of-band message, such as an ASM, to send information about the desired service to the serving node. The information about the service could include the type of service, class of service, and/or data rate and may be sent in the vendor-specific extension of the ASM.

The agent in the serving node extracts the traffic information and updates the traffic information database for the session. The agent, along with the traffic management system, then checks whether the requested traffic characteristics are within the bounds of the service level agreement for the mobile unit. If the request is valid, the serving node sends a request through the RP interface to the base station to determine whether the RF resources are available to support the requested traffic characteristics. The base station may check the forward power, available logical resources, currently utilized bandwidth, and/or other factors to decide whether to allocate the requested bandwidth. The base station then uses RP interface to send an acknowledgement to the serving node. Based on the result received from the base station, the serving node updates the traffic information and sends the result to the mobile unit through an out-of-band message, such as the vendor-extension in an AAM.

After establishing the session and the initial service, it is possible that the mobile unit will desire additional services. When an application requests an additional service, the mobile unit will send an out-of-band message to the serving node through the data link established for the first service. The serving node determines whether the service request is within the service level agreement and, if so, queries the base station as to whether adequate RF resources are available for the new service. If available, the base station reserves the resources and sends an acknowledgment to the serving node through the RP interface. The serving node updates the traffic information and sends an acknowledgement to the mobile unit using an out-of-band message, such as an AAM.

The message format between the serving node 24 and the base station 38 may be modified to support the messaging between the two. For example, in one embodiment, private extensions are added to the messages between the serving node 24 and the base station 38 such that the base station can decide whether sufficient radio resources are available for the service request. The private extensions added to the RP interface may carry mobile unit requested traffic profile and base station granted characteristics. The base station may also use these to request the serving node to inform the mobile unit to degrade a service in a service request or other services corresponding to the data session originating from the mobile unit.

When mobile unit 14 is outside the range of its home agent 30 such that communication with the network 22 is provided by foreign agent 70, the serving node 24 recognizes that mobile unit 14 is communicating with a transceiver 50 in one of cells 46 for the base station 38 corresponding to the serving node 24. Based on this recognition, the foreign agent 70 for the serving node 24 transmits an agent advertisement message (AAM) on the RP link 42 for the mobile unit 14. In this way, only the mobile unit 14 associated with the RP link 42 receives the AAM. The AAM includes a header, router advertisement information, a mobile advertisement extension and other extensions, as shown in FIG. 2B. The foreign agent 70 generates the AAM as a broadcast or multicast message, or other suitable type of message that may be processed by the mobile unit 14 before an IP address is assigned to the mobile unit 14, with a source address of the foreign agent 70. The foreign agent 70 provides the COA by setting the COA field in an agent advertisement extension of the AAM.

After receiving the AAM from the foreign agent 70, the mobile unit 14 transmits a registration request message (RReqM) to the foreign agent 70 as a home link directed broadcast message. The RReqM includes a user identifier, a mobile identifier, a telephone number, or other suitable information from which a home agent 30 may identify the mobile unit 14.

The foreign agent 70 transmits the RReqM throughout the network 22 to identify home agents 30 for the mobile unit 14. Any home agent 30 in the home network for the mobile unit 14 that receives the RReqM from the foreign agent 70 may respond by transmitting a registration reply message (RRepM). The RRepM includes a home agent address and a code field value indicating a rejection of the request. The foreign agent 70 receives an RRepM from each home agent 30, stores relevant information regarding the home agents 30 in the binding table 72, and transmits these messages to the mobile unit 14 over the RP link 42 for the mobile unit 14.

The mobile unit 14 selects one home agent 30 and transmits an RReqM to the foreign agent 70 that indicates which home agent 30 has been selected. The foreign agent 70 updates the binding table 72 and transmits the RReqM to the selected home agent 30 which assigns an IP address for the mobile unit 14. The foreign agent 70 also notifies the selected home agent 30 of the COA of the foreign agent 70 for forwarding packets to the mobile unit 14.

The selected home agent 30 transmits an RRepM including the IP address for the mobile unit 14 to the foreign agent 70. The foreign agent 70 transmits the RRepM to the mobile unit 14 over the RP link 42. The mobile unit 14 retrieves the IP address from the RRepM as its address for communication. At this point, the mobile unit 14 may send messages with the retrieved IP address as a source address and may process messages with the retrieved IP address as a destination address.

The selected home agent 30 notifies the network 22 with a broadcast message that any messages with the IP address of the mobile unit 14 as a destination address are to include a media access control (MAC) address for the home agent 30. The network routers update their routing tables to include the MAC address of the home agent 30 for the IP address of the mobile unit 14. Each message for the mobile unit 14 will then comprise the MAC address of the home agent 30 and the destination IP address of the mobile unit 14. The home agent 30 intercepts each packet destined for the mobile unit 14. Based on the COA of the foreign agent 70, the home agent 30 tunnels the intercepted packets to the foreign agent 70. The foreign agent 70 extracts the original packets and delivers them to the mobile unit 14.

If the mobile unit 14 moves to a cell for a different base station corresponding to a different serving node and foreign agent, the home agent 30 updates the COA in the binding table 40 to correspond to the new foreign agent. In this way, messages for the mobile unit 14 will be tunneled to the appropriate foreign agent, which may then transmit the messages to the mobile unit 14. According to one embodiment, the mobile unit 14 sends an RReqM to the current foreign agent, which relays the message to the home agent 30. The home agent 30 updates entries in the binding table 40 with the new COA and sends an RRepM to the mobile unit 14 through the current foreign agent. The previous foreign agent removes the information from the binding table after the expiration of a timer.

Figure 2A:
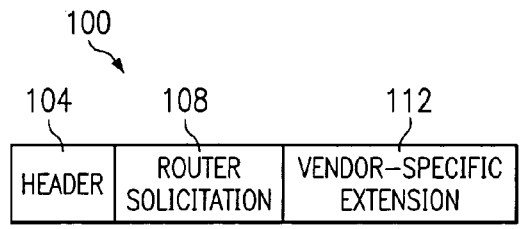
FIG. 2A illustrates a message structure for an Agent Solicitation Message (ASM) for providing out-of-band communication within the communications system of FIG. 1 in accordance with one embodiment of the present invention.

FIG. 2A illustrates a message structure for an Agent Solicitation Message (ASM) 100 for providing out-of-band communication within the system 10 in accordance with one embodiment of the present invention. ASM 100 includes a header 104, a router solicitation field 108, and a vendor-specific extension 112. In accordance with one embodiment, ASM 100 is an Internet Control Message Protocol (ICMP) router solicitation message with extensions. The ASM 100 is transmitted from mobile unit 14 to foreign agent 70 or other serving node element in order to set up sessions, to set up services within a session, to hand-off between serving nodes, to assist in service management, to assist in managing traffic during a session, and/or to perform any other suitable task. The vendor-specific extension 112 provides out-of-band communication in that the foreign agent 70 receives and processes the information in the vendor-specific extension 112 without having to process payload data in in-band messages.

Figure 2B:
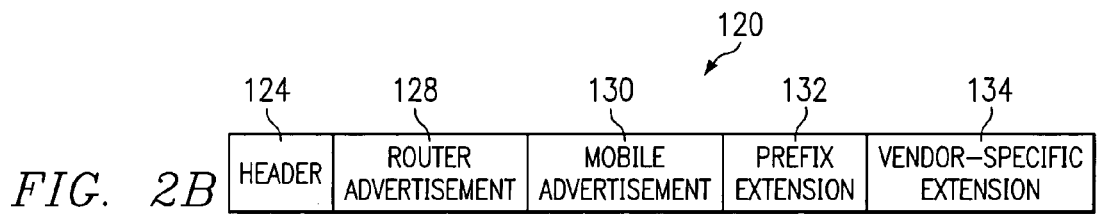
FIG. 2B illustrates a message structure for an Agent Advertisement Message (AAM) for providing out-of-band communication within the communications system of FIG. 1 in accordance with one embodiment of the present invention.

FIG. 2B illustrates a message structure for an Agent Advertisement Message (AAM) 120 for providing out-of-band communication within the system 10 in accordance with one embodiment of the present invention. The AAM 120 includes a header 124, a router advertisement field 128, a mobile advertisement field 130, a prefix length extension 132, and a vendor-specific extension 134. In accordance with one embodiment, the AAM 120 is an ICMP router advertisement message with extensions. The AAM 120 is transmitted from the foreign agent 70 or other surviving node element to the mobile unit 14 in order to set up sessions, to set up services within a session, to hand-off between serving nodes, to assist in service management, to assist in managing traffic during a session, and/or to perform any other suitable task. The vendor-specific extension 134 provides out-of-band communication in that the mobile unit 14 receives and processes the information in the vendor-specific extension 134 without having to process payload data in in-band messages.

Figure 2C:
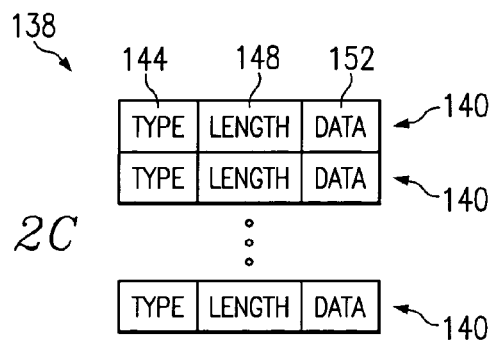
FIG. 2C illustrates a message structure for the Vendor-Specific Extensions of the ASM and the AAM of FIGS. 2A–B in accordance with one embodiment of the present invention.

FIG. 2C illustrates a message structure for a vendor-specific extension 138 in accordance with one embodiment of the present invention. The vendor-specific extension 138 may be the vendor-specific extension 112 of the ASM 100 and/or the vendor-specific extension 134 of the AAM 120. The vendor-specific extension 138 may include one or more data extensions 140.

Each data extension 140 includes a data type field 144, indicating what type of data is included in the data extension 140, a data length field 148, indicating the length of the data included in the data extension 140, and a data field 152, containing the actual data for the data extension 140. The data type field 144 may indicate "application identifier," "user data," or any other suitable data type known to both a service provider for the network 22 and the mobile vendors. The data length field 148 may indicate the length of the data field 152 in bytes. The format and length of the data field 152 may be determined by the data type 144 and data length 148. Data extensions 140 allow variable amounts of information to be included within each discovery message.

In a particular embodiment, the data extensions 140 are used in pairs. The first data extension 140 conveys an identifier associated with the application requesting service in the data field 152, and the second data extension conveys the data associated with the service in the data field 152. The appropriate indicators for the data fields are placed in type field 144. Thus, when the serving node responds, the mobile unit will know with which application the response is associated. A variety of other combinations and/or arrangements of the data extensions exist.

Figure 3:
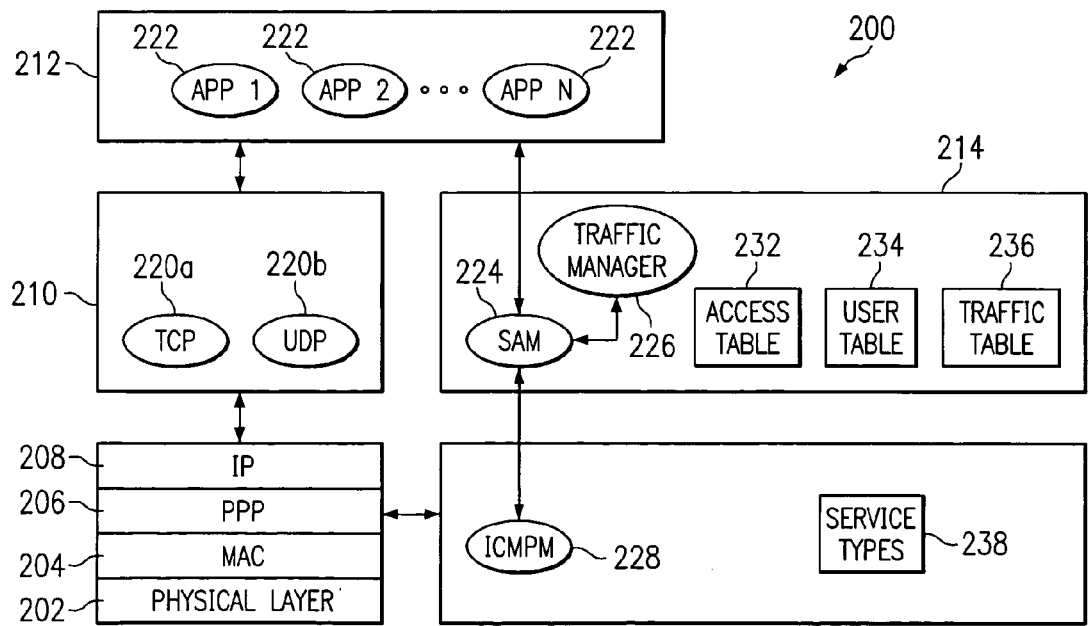
FIG. 3 is a block diagram illustrating a protocol stack for communications of a mobile over the wireless link of the communications system of FIG. 1 in accordance with one embodiment of the present invention.

FIG. 3 is a block diagram illustrating a protocol stack 200 for communications of a mobile unit over the wireless link 56 in accordance with one embodiment of the present invention. The protocol stack 200 is operable to authenticate mobile unit 14, establish radio frequency links to serving node 24, and manage these links. The protocol stack 200 includes a physical layer 202, a MAC layer 204, a point-to-point protocol (PPP) layer 206, and an IP layer 208.

The protocol stack 200 also includes a transport layer 210, an application layer 212, an access layer 214, and an ICMP layer 216. The transport layer 210 is operable to process in-band communications. The application layer 212 includes one or more applications 222, each of which may be executed in the mobile unit 14 either alone or concurrently with other applications 222. The applications 222 may comprise telephony, video, voice, web browser, or any other suitable applications. The transport layer 210 includes one or more protocols 220 for the applications 222. For example, the transport layer 210 may include a transmission control protocol 220a for packet data applications 222, a user datagram protocol 220b for mobile IP applications 222, or any other suitable protocol 220.

The access layer 214 includes a service access manager (SAM) 224 that is operable to manage out-of-band communications for a plurality of applications 222 in the mobile unit 14 and a traffic manager 226 that is operable to maintain the status of the traffic sizing and characteristics for the mobile unit 14 and to assist the SAM 224 in determining if new service requests are allowable. In particular embodiments, the traffic manager 226, based on the traffic characteristics, also performs traffic queuing when the radio resources are not available.

The ICMP layer 216 includes an ICMP manager 228 that is operable to generate out-of-band messages for the mobile unit 14.

The managers 224, 226 and 228, as well as other components in the system 10, comprise logic encoded in media. The logic includes functional instructions for carrying out program tasks. The media may be computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

As described below in connection with FIG. 4, the access layer 214 also includes a service access table 232, stores data for the service access manager 224, such as session allowability and additional information, and the ICMP layer 216 also includes a vendor-defined service type table 238, which stores data for the ICMP manager 228, such as valid data types 144.

Access layer 214 also includes user table 234, which stores information regarding each of users 54, and traffic table 236, which stores information regarding the utilization of wireless link 56. The information regarding users 54 may include the type of service of which the application is capable, such as, for example, ftp, tftp, e-mail, and/or push services, whether the application is running locally on the mobile unit or on a host subtending the mobile unit, the application user name and password, and/or associated identifiers. The information regarding the wireless link may include the requested bandwidth, the approved bandwidth, the drop precedence, the delay budget, and/or the quality of service for each service in a session. Tables 232, 234, 236 and 238 may be any suitable data store.

Because the mobile unit 14 may execute a plurality of applications 222 simultaneously, the vendor-specific extension 112 of the ASM 100 may include a data extension 140 with an application identifier to identify the application 222 providing the data and a data extension 140 with the corresponding data from the application 222. The application identifier may be assigned by the SAM 224. In addition, the vendor-specific extension 134 of the AAM 120 may include a data extension 140 with an application identifier to identify the application 222 to receive the data and a data extension 140 with the corresponding data for the application 222. The ICMP manager 228 may compose the ASM, decompose the AAM, and provide and analyze the data types in the vendor-specific extensions based on the service type table 238. The service access manager 224 is operable to resolve incoming and outgoing messages based on the application identifier for each application 222.

In operation, when an AAM 120 is received, the ICMP manager 228 performs an initial parsing of the vendor-specific extension 134. The ICMP manager 228 compares the data type 144 with the service type table 238. If a match is found, the ICMP manager 228 provides the vendor-specific extension 134 to the service access manager 224. The service access manager 224 identifies the appropriate application 222 based on the application identifier in the vendor-specific extension 134 of the AAM 120 and provides the data to the identified application 222.

In addition, when an application 222 provides data for the foreign agent 70 to the service access manager 224, the service access manager 224 provides the data and the application identifier for the application 222 to the ICMP manager 228. The ICMP manager 228 then generates an ASM 100 including the application identifier and the data in the vendor-specific extension 112.

Figure 4A:
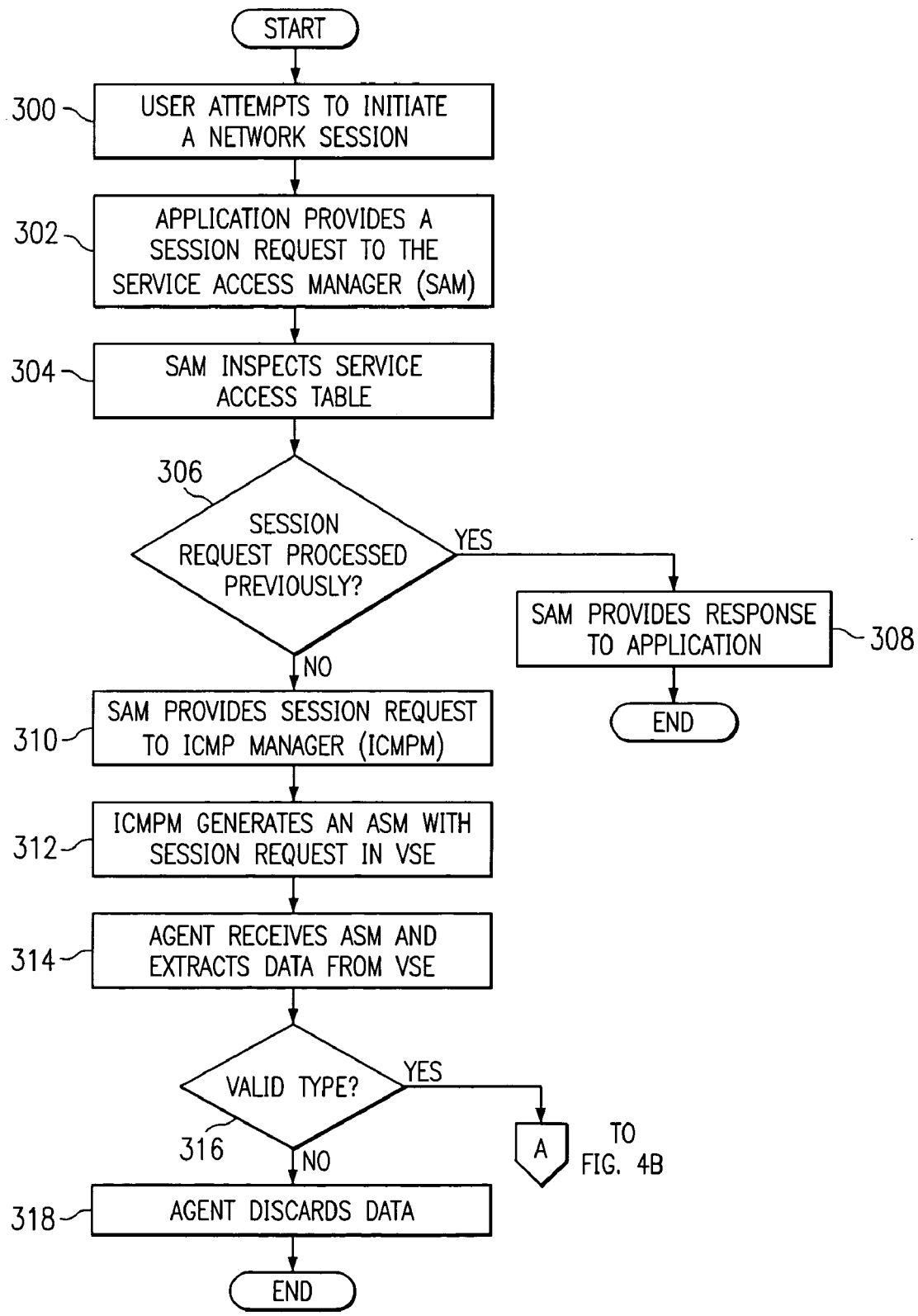
FIG. 4 is a flow diagram illustrating a method for establishing a session for a mobile unit in accordance with one embodiment of the present invention.
Figure 4B:
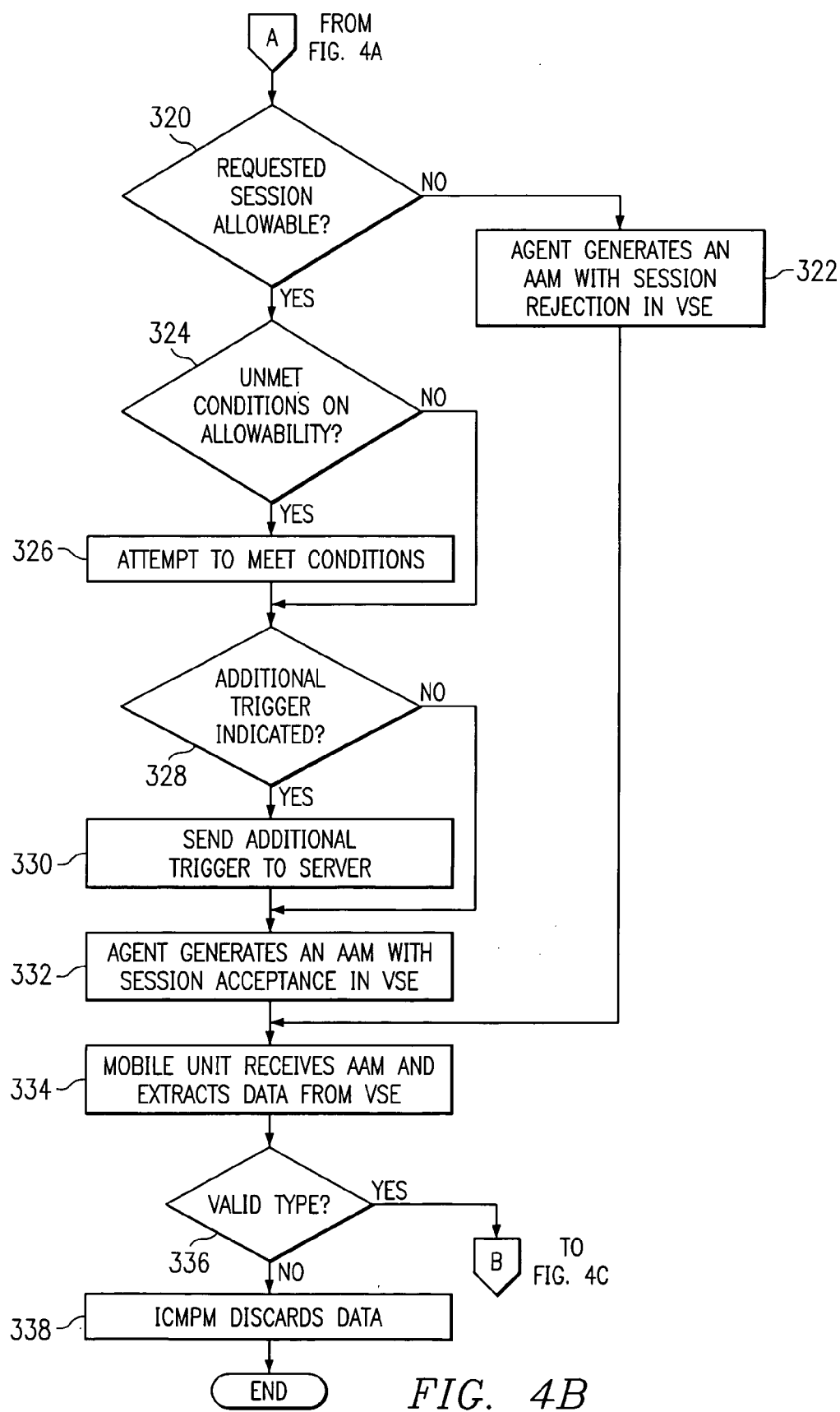
Figure 4C:
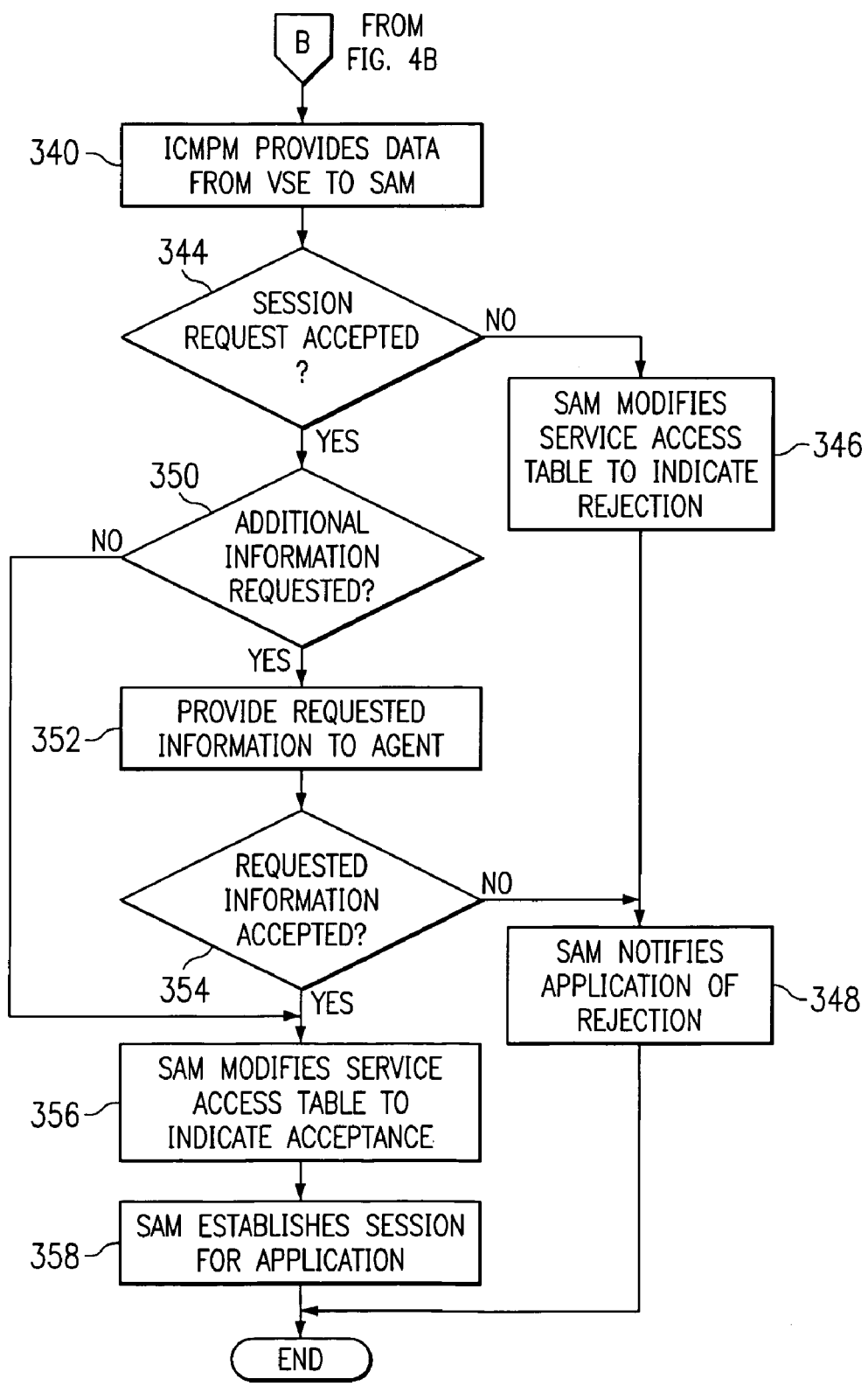

FIG. 4 is a flow diagram illustrating a method for establishing a session for a mobile unit in accordance with one embodiment of the present invention. The method begins at step 300 where one of users 54 attempts to initiate a network session for one of applications 222 over an existing connection. At step 302, the application 222 provides a session request to the service access manager (SAM) 224. According to one embodiment, the session request includes an application identifier for the application 222 and session data, such as a URL for a web-site which the user 54 is attempting to access.

At step 304, the SAM 224 inspects the service access table 232, which tracks previously accepted and rejected session initiation attempts for each application 222. At decisional step 306, the SAM 224 determines whether the session request was processed previously based on the data in the service access table 232. This determination may include, for example, matching a requested URL to a URL stored in the service access table 232 in association with the requesting application 222. If the session request was processed previously, the method follows the Yes branch from decisional step 306 to step 308.

At step 308, the SAM 224 provides the response indicated in the service access table to the application 222. Thus, if the request was previously accepted by the serving node 24, the SAM 224 provides an "accepted" response to the application 222, while if the request was previously rejected by the serving node 24, the SAM 224 provides a "rejection" response to the application 222. At this point, the method comes to an end. Thus, using the service access table 232, the SAM 224 in the mobile unit 14 may handle previously processed session requests without utilizing communication resources or serving node resources and without accessing external resources. As used herein, therefore, without accessing external resources means without accessing external resources at the time the SAM 224 is processing the previously processed request, as opposed to at the time the SAM 224 initially processes a request and obtains the response for storage in the service access table 232.

Returning to decisional step 306, if the session request was not processed previously, the method follows the No branch from decisional step 306 to step 310. At step 310, the SAM 224 provides the session request to the ICMP manager (ICMPM) 228. At step 312, the ICMPM 228 generates an ASM 100 with the session request in the vendor-specific extension 112 and transmits the ASM 100 to the foreign agent 70.

At step 314, the foreign agent 70 receives the ASM 100 from the mobile unit 14 and extracts data from the vendor-specific extension 112. At decisional step 316, the foreign agent 70 determines whether the data types 144 for the data extensions 140 in the vendor-specific extension 112 are valid based on a comparison to data types 144 in the service type table 238. If the data types 144 are not valid, the method follows the No branch from decisional step 316 to step 318.

At step 318, the foreign agent 70 discards the data from the vendor-specific extension 112, and the method comes to an end. In this situation, the expiration of a timer at the mobile unit 14 may indicate to the mobile unit 14 that the foreign agent 70 has not responded in a timely manner. The mobile unit 14 may then attempt to re-send the ASM 100.

Returning to decisional step 316, if the data types 144 are valid, the method follows the Yes branch from decisional step 316 to decisional step 320. At decisional step 320, the foreign agent 70 determines whether the requested session is allowable based on the service level agreement for the user 54 provided to the serving node 24 by the core 62. If the requested session is not allowable, the method follows the No branch from decisional step 320 to step 322. At step 322, the foreign agent 70 generates an AAM 120 with a session rejection in the vendor-specific extension 134 and transmits the AAM 120 to the mobile unit 14. The method then continues to step 334.

Returning to decisional step 320, if the requested session is allowable, the method follows the Yes branch from decisional step 320 to decisional step 324. At decisional step 324, the foreign agent 70 determines whether any unmet conditions on the allowability of the session exist, such as user authentication, receipt of billing information, bandwidth availability, and the like. Accordingly, a session request may be allowed, rejected or conditionally allowed. If there are unmet conditions on the allowability of the session, the method follows the Yes branch from decisional step 324 to step 326. At step 326, the foreign agent 70 attempts to meet the conditions without user input, if possible. For example, if a user 54 may be authenticated based on data in the core 62 for that user 54, the foreign agent 70 may meet an authentication condition without user input. The method then continues to step 328.

Returning to decisional step 324, if there are no unmet conditions on the allowability of the session, the method follows the No branch from decisional step 324 to step 328. At step 328, the foreign agent determines whether any additional triggers are indicated by the session request. Additional triggers may comprise informing one of servers 18 of the session request or other suitable triggers. If an additional trigger is indicated, the method follows the Yes branch from decisional step 328 to step 330. At step 330, the foreign agent 70 sends an additional trigger to one or more servers 18 through the network 22 in accordance with the indicated additional triggers. The method then continues to step 332.

Returning to decisional step 328, if an additional trigger is not indicated, the method follows the No branch from decisional step 328 to step 332. At step 332, the foreign agent 70 generates an AAM 120 with a session acceptance in the vendor-specific extension 134 and transmits the AAM 120 to the mobile unit 14. At step 334, the mobile unit 14 receives the AAM 120 generated in either step 322 or step 332 and extracts the data from the vendor-specific extension 134.

At decisional step 336, the ICMPM 228 determines whether the data types 144 for the data extensions 140 in the vendor-specific extension 134 are valid based on a comparison to data types 144 in the service type table 238. If the data types 144 are not valid, the method follows the No branch from decisional step 336 to step 338. At step 338, the ICMPM 228 discards the data from the vendor-specific extension 134, and the method comes to an end. In this situation, the expiration of a timer at the foreign agent 70 may indicate to the foreign agent 70 that the mobile unit 14 has not responded in a timely manner. The foreign agent 70 may then attempt to re-send the AAM 120.

Returning to decisional step 336, if the data types 144 are valid, the method follows the Yes branch from decisional step 336 to step 340. At step 340, the ICMPM 228 provides the data from the vendor-specific extension 134 to the SAM 224. At decisional step 344, the SAM 224 determines whether the session request was accepted by the foreign agent 70. If the session request was not accepted, the method follows the No branch from decisional step 344 to step 346. At step 346, the SAM 224 modifies the service access table 232 to indicate that the session request was rejected. At step 348, the SAM 224 notifies the application 222 that the session request was rejected, at which point the method comes to an end.

Returning to decisional step 344, if the session request was accepted, the method follows the Yes branch from decisional step 344 to decisional step 350. At decisional step 350, the SAM 224 determines whether additional information was requested by the foreign agent 70. For example, if an unmet condition on allowability was found to exist in step 324 that could not be met without user input in step 326, additional information may be requested through the vendor-specific extension 134 of the AAM 120. If additional information was requested, the method follows the Yes branch from decisional step 350 to step 352.

At step 352, the additional information received from the user 54 is provided to the foreign agent 70. At decisional step 354, the foreign agent 70 determines whether the additional information is acceptable. If the additional information is unacceptable, the method follows the No branch from decisional step 354 and returns to step 348, where the SAM 224 notifies the application 222 that the session request was rejected.

Returning to decisional step 354, if the additional information is acceptable, the method follows the Yes branch from decisional step 354 to step 356. Also, returning to decisional step 350, if additional information was not requested, the method follows the No branch from decisional step 350 to step 356. At step 356, the SAM 224 modifies the service access table 232 to indicate that the session request was accepted. At step 358, the SAM 224 establishes the requested session for the application 222, at which point the method comes to an end.

In this way, out-of-band communication is provided between the mobile unit 14 and the foreign agent 70 of the serving node 24. In addition, previously accepted or rejected session requests are tracked in the mobile unit 14 through the service access table 232 such that the serving node 24 is not required to re-verify a session request that has been processed previously. Thus, the foreign agent 70 may accept or reject session requests without checking the contents of the payload data for each message sent from the mobile unit 14. Accordingly, the burden on the resources of the serving node 24 is greatly reduced, freeing those resources to accomplish other tasks.

Figure 5:
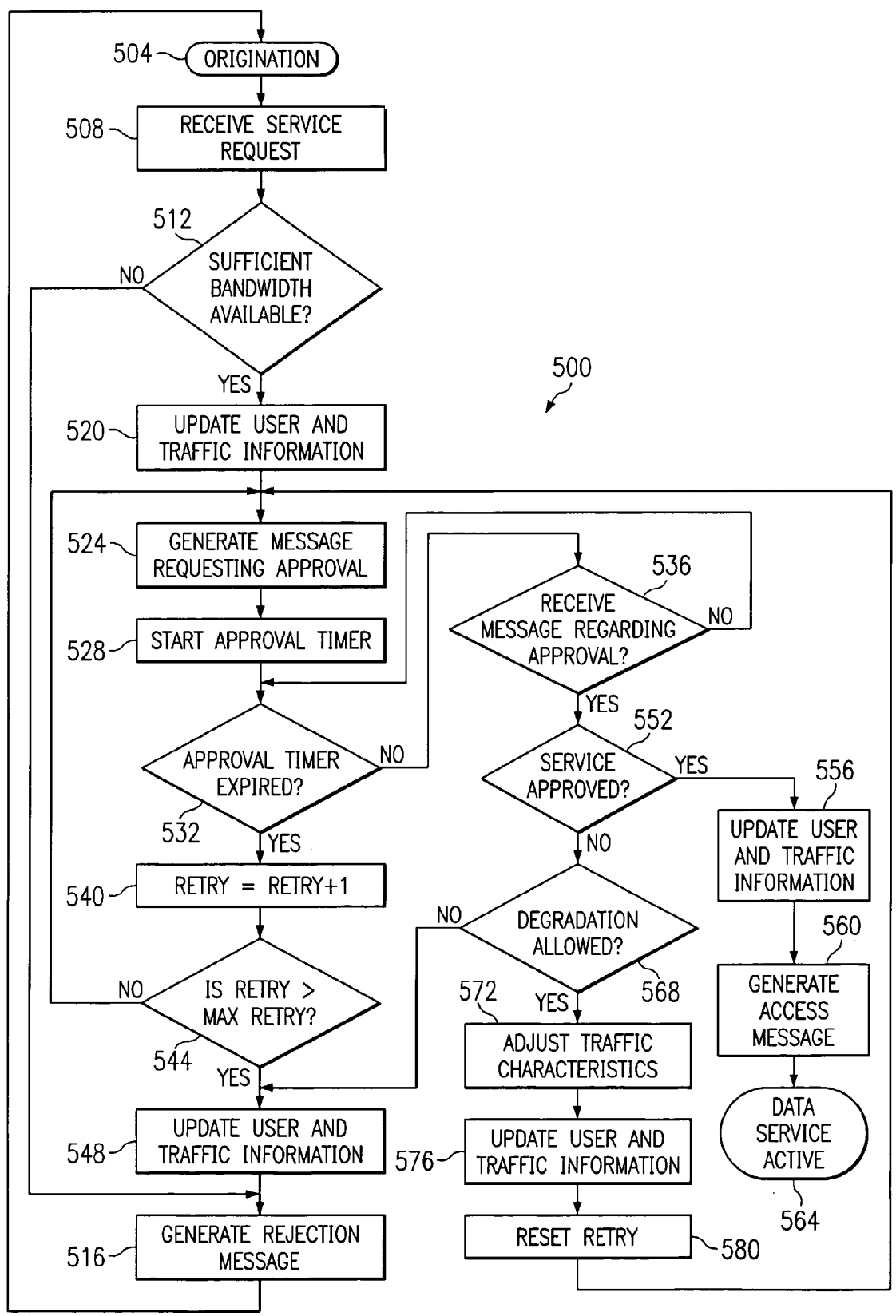
FIG. 5 is a flow diagram illustrating a method for requesting a service in accordance with one embodiment of the present invention.

FIG. 5 is a flow diagram 500 illustrating a method for requesting a service in accordance with one embodiment of the present invention. The process begins at state block 400, where the mobile unit may or may not already have a session established with a serving node. At function block 508, the mobile unit receives a service request from or for an application. The request may identify a bandwidth or the traffic manager may set a bandwidth for the request. The application may facilitate this by, for example, sending a service request to SAM 224. At decision block 512, the mobile unit determines whether sufficient bandwidth is available for this request. This bandwidth may involve the capability of the mobile unit and/or the allocated wireless bandwidth for the mobile unit. For example, SAM 224 may query traffic manager 226 to determine the amount of bandwidth currently being used on the wireless link and the priority of the traffic on the link. This information may be compared against the amount of bandwidth required for the requested service and the priority of the service to determine whether sufficient bandwidth is available. If sufficient bandwidth is not available, the mobile unit generates a rejection message at function block 516, which is sent to the application, and returns to state block 504.

If, however, sufficient bandwidth is available, the mobile unit, based on the service request, updates the user information and the traffic information at function block 520. In this embodiment, the mobile unit keeps track of the traffic characteristics associated with the current services in order to understand if and how to degrade traffic within the session to remain within service level agreements. At function block 524, the mobile unit generates a message requesting network approval for the service, which is sent to the serving node. For example, SAM 224 may provide the service request to the ICMP manager 228, which can generate an ASM 100 with the service request including a requested bandwidth in the vendor-specific extension 112. The ASM may use the same link allocated to a previous data service and will terminate at the agent of the serving node. At function block 528, the mobile unit starts a timer for receipt of a response to the approval message.

At decision block 532, the mobile unit determines whether the approval timer has expired. If the approval timer has not expired, the mobile unit determines whether it has received a message regarding approval at decision block 536. If the mobile unit has not received a message regarding the approval message, the mobile unit returns to decision block 532 to again determine whether the timer has expired. The mobile unit will continue to cycle between decision block 532 and decision block 536 until the expiration of the timer or receipt of the message regarding approval. Alternatively, the mobile unit may remain in a wait response state until receipt of a response or expiration of the timer.

If the approval timer expires before the message is received, the mobile unit increments a variable indicating the number of retrys at function block 540, and determines whether the number of retrys has exceeded the maximum number of retrys allowed at decision block 544. If the number of retrys has not exceeded the number of maximum retrys, the mobile unit generates another message requesting approval at function block 524. If, however, the maximum number of retrys has been exceeded, the mobile unit updates the user and traffic information based on the fact that no response has been received regarding approval and generates a rejection message at function block 516.

If, however, the mobile unit receives a message regarding approval of the service request before the expiration of the approval timer, the mobile unit determines whether the service request has been approved at decision block 552. The message, for example, may arrive in the vendor-specific extension of AAM 120 and be passed from the ICMP manager 228 to the SAM 224 for processing. If the service request has been approved, the mobile unit updates the user information and traffic information to reflect this fact at function block 556 and generates an access message, which is sent to the requesting user, at function block 560. The mobile unit then enters a state in which the data service is active at state block 564.

If, however, the service request has not been approved, the mobile unit determines whether degradation is allowed at decision block 568. The mobile unit may perform this by having traffic manager 226 determine the bandwidth and/or QOS of the current service within the session. In a particular embodiment, the traffic manager 226 also performs the upgrading/downgrading operations. If degradation is not allowed, the mobile unit updates the user and traffic information at function block 548 to reflect the fact that the service request has not been approved. The mobile unit then generates a rejection message for the application at function block 516 and returns to the origination state at state block 504.

But if degradation is allowed, the mobile unit adjusts the traffic characteristics of the data services using the wireless link to allow for this degradation at function block 572 and updates the user and traffic information at function block 576. For example, if an application is running a background data session, such as an ftp, the rate and class of service may be degraded. The mobile unit then resets the retry variable at function block 580 and returns to function block 524 to begin the approval process again. This time, however, the ASM 100 will include the bandwidth and/or other characteristics of the degraded data sessions.

Although a variety of functions for the mobile unit have been discussed with respect to flowchart 500, in different embodiments, a mobile unit may have fewer, more and/or an alternative ordering of functions. For example, a mobile unit may not determine whether sufficient bandwidth is available on its own, instead relying solely on the determination by the serving node. As another example, the mobile unit may check whether the service request has been previously rejected and make a determination as to whether to proceed with the service request based on this information. As a further example, the mobile unit may not allow for degradation of other data services. As still a further example, the mobile unit may determine that degradation is available and/or required before seeking approval of a data service. The mobile unit may send the degradation information to the serving node through the ASM.

Figure 6:
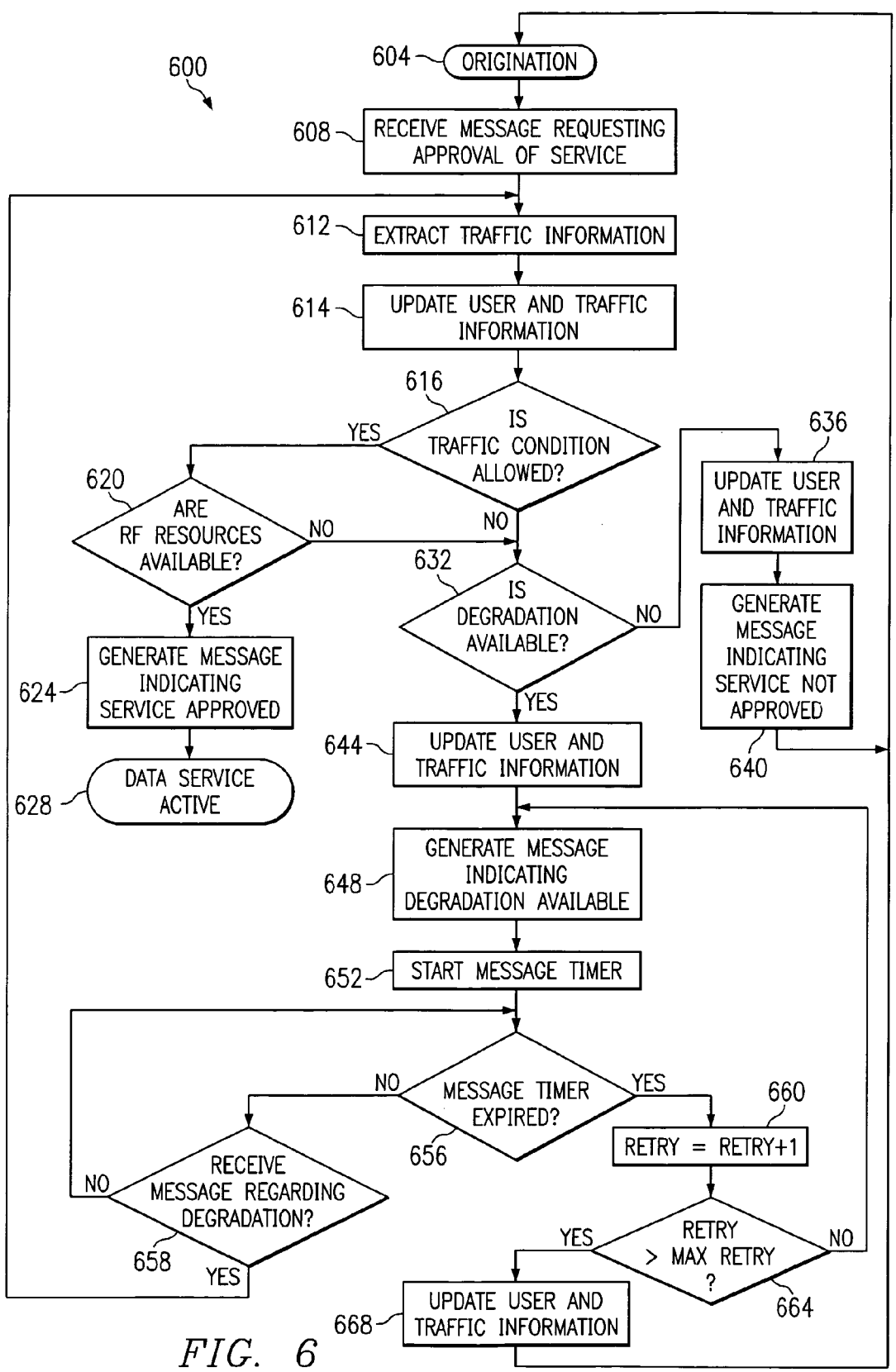
FIG. 6 is a flow diagram illustrating a method for handling a service request in accordance with one embodiment of the present invention.

FIG. 6 is a flow diagram 600 illustrating a method for handling a service request in accordance with one embodiment of the present invention. The process begins at state block 604, where the serving node may or may not already have a data session established with the mobile unit. At function block 608, the serving node receives a message requesting approval of a service. The message may arrive in the vendor-specific extension of ASM 100 and be received by foreign agent 70. At function block 612, the serving node extracts the bandwidth or other traffic information from the message. The serving node then updates the user and traffic information based on this information at function block 614. The serving node determines whether the traffic conditions are allowed at decision block 616. To accomplish this, the serving node may query the subscriber database 66 to determine, for example, whether the mobile unit has already used its allocated bandwidth. If the traffic condition is allowed, the serving node determines whether sufficient RF resources are available at decision block 620. The serving node may perform this function by having the base station or other wireless node determine if the radio resources necessary for the session are available. A wireless node is a node operable to receive or store information indicative of the state of the wireless link and/or network, such as energy levels.

In performing this function, the base station may use forward power estimation, which attempts to optimize the bandwidth depending on the quality of service level (QOS) for each user. To accomplish this, the base station may compute the amount of power required by each data service of a session:

$$P_m = K \frac{E_b/I_o}{W/R} \left[ 1 + \sum_{j=2}^{J} S_{ji}/S_{1i} + N_o W/S_{1i} \right]; \text{ where}$$

$P_m$ is the fraction of total power required to transmit information to user i in order to maintain a certain QOS; $E_b$ is the energy per bit;
$I_O$ is the interference power density per Hertz;
R is the information bit rate;

W is the transmission bandwidth;
$S_{1i}$ is the power received by mobile unit i from the BTS;
$S_{ji}$ is the power received by mobile unit i from the $BTS_j$;
K is a correction factor to take into account various uncertainties, such as geographic location and terrain condition; and
$N_O W/S_{1i}$ is the thermal noise.

Thus, a mobile unit will encounter interference from its BTS and the surrounding BTS's due to forward power destined for other mobile units. Interference from other mobile units, however, is negligible because they transmit in different frequency bands than the BTS's.

The QOS attributes that dictate quality are bit error rate and data rate, which are proportional to transmit power. Typically, twenty-five percent of the power is reserved for overhead channels, such as pilot and paging, a small fraction is reserved for handoff, and the rest is reserved to maintain a minimum energy to interference ratio, typically around 7 dB. Hence, the packets in the queue at the serving node can be mapped to the excess power and, therefore, QOS may be maintained. In a particular embodiment, the serving node can estimate the excess bandwidth, using, for example, the above equation.

If the affected cell has unallocated power resources to satisfy the computed and/or estimated power of the services or sufficient RF resources are otherwise determined to be available, the serving node generates a message indicating that the session is approved at function block 624 and enters a state in which the data service is active at state block 628.

If, however, the traffic condition is not approved or sufficient RF resources are not available, the serving node determines whether degradation is available at decision block 632. If degradation is not available, the serving node updates the user and traffic information at function block 636 to reflect this fact and generates a message indicating that the session is not approved at function block 640. The serving mode then returns to the origination state at state block 604.

If, however, degradation is available, the serving node updates the user and traffic information at function block 644 and generates a message indicating that degradation is available and the allowed bandwidth at function block 648. The message may be sent to the mobile unit as part of AAM 100 with the allowed bandwidth in the extension. The serving node then starts a message timer at function block 652.

At decision block 656, the serving node determines whether the message timer has expired. If the message timer has not expired, the serving node determines whether a message regarding degradation has been received at decision block 658. If a message regarding degradation has been received, the serving node proceeds to function block 612 to process the information in the message. If a message has not been received, the serving node again examines the timer.

If the message timer expires before the serving node receives a response to the message, the serving node increments a variable indicating the number of retrys of the degradation message at function block 660 and determines whether the number of retrys has exceeded the maximum number of retrys allowed at decision block 664. If the number of retrys has not exceeded the maximum number of retrys, the serving node returns to function block 648 to resend the message. If, however, the number of retrys exceeds the maximum number, the serving node updates the user and traffic information at function block 668 and returns to state block 604.

Although flowchart 600 illustrates a variety of operations for the serving node, other embodiments may have fewer, more, and/or alternate arrangements of operations. For example, the serving node may itself determine whether sufficient RF resources are available based on information received on the status of the wireless network. As a further example, the serving node may not determine whether degradation is available. As still a further example, the serving node may determine whether the session is in accord with the service level agreement for the user. A variety of other examples exist.

After a service is established and allocated a wireless bandwidth, traffic destined for the application may be controlled and/or throttled at the serving node based on QOS and the bandwidth for the service. Thus, the traffic may be forwarded out of the queue for a service at a rate corresponding to allocated bandwidth in the wireless network. Thus, substantially no priority independent congestion control and/or packet drops need to take place for transmission over the wireless link. Rather, RF transmissions are QOS based due to queuing and/or selectivity in the serving node.

Although the present invention has been described with several embodiments, various changes and modifications may be suggested to one skilled in the art. It is intended that the present invention encompasses such changes and modifications as fall within the scope of the appended claims.

What is claimed is:

1. A method for managing wireless bandwidth resources, comprising:
   receiving at a serving node a service request for a mobile unit;
   communicating with a wireless network node to determine whether sufficient wireless bandwidth is available for the requested service; and
   processing the service request based on the availability of wireless bandwidth and on current wireless bandwidth used by the mobile unit, wherein the service request is received out-of-band, and wherein the service request is part of a vendor-specific extension of an agent solicitation message.

2. The method of claim 1, wherein the service request includes the requested bandwidth for the service.

3. The method of claim 1, further comprising:
   determining if the requested bandwidth is available; and
   generating a message denying the service request if the requested bandwidth is not available.

4. The method of claim 1, wherein the service request is for service in a cell and determining whether sufficient wireless bandwidth is available includes using forward power estimation to determine bandwidth availability for the cell.

5. The method of claim 1, further comprising determining whether the requested service is allowed based on a service level agreement for the mobile unit.

6. The method of claim 1, further comprising generating a message requesting the mobile unit to degrade the requested service if sufficient bandwidth is not available.

7. The method of claim 1, further comprising determining whether degradation of another service is allowed if there is not sufficient bandwidth for the requested service.

8. The method of claim 1, further comprising generating a message indicating that degradation is available if degradation is allowed.

9. A system for managing wireless bandwidth resources, comprising:
   a computer-processable medium; and
   logic stored on the computer-processable medium, the logic operable to:
      receive at a serving node a service request for a mobile unit;
      communicate with a wireless network node to determine whether sufficient wireless bandwidth is available for the requested service; and
      process the service request based on the availability of wireless bandwidth and on current wireless bandwidth used by the mobile unit, wherein the service request is received out-of-band, and wherein the service request is part of a vendor-specific extension of an agent solicitation message.

10. The system of claim 9, wherein the service request includes the requested bandwidth for the service.

11. The system of claim 9, wherein the logic is further operable to:
    determine if the requested bandwidth is available; and
    generate a message denying the service request if the requested bandwidth is not available.

12. The system of claim 9, wherein the service request is for service in a cell and the logic is operable to determine whether sufficient wireless bandwidth is available by using forward power estimation to determine bandwidth availability for the cell.

13. The system of claim 9, wherein the logic is further operable to determine whether the requested service is allowed based on a service level agreement for the mobile unit.

14. The system of claim 9, wherein the logic is further operable to generate a message requesting the mobile unit to degrade the requested service if sufficient bandwidth is not available.

15. The system of claim 9, wherein the logic is further operable to determine whether degradation of another service is allowed if there is not sufficient bandwidth for the requested service.

16. The system of claim 9, wherein the logic is further operable to generate a message indicating that degradation is available if degradation is allowed.

17. A system for managing wireless bandwidth resources, comprising:
    means for receiving at a serving node a service request for a mobile unit;
    means for communicating with a wireless network node to determine whether sufficient wireless bandwidth is available for the requested service; and
    means for processing the service request based on availability of wireless bandwidth and on current wireless bandwidth used by the mobile unit, wherein the service request is received out-of-band, and wherein the service request is part of a vendor-specific extension of an agent solicitation message.

18. The system of claim 17, wherein the service request includes the requested bandwidth for the service.

19. The system of claim 17, further comprising:
    means for determining if the requested bandwidth is available; and
    means for generating a message denying the service request if the requested bandwidth is not available.

20. The system of claim 17, wherein the service request is for service in a cell and determining whether sufficient wireless bandwidth is available includes using forward power estimation to determine bandwidth availability for the cell.

21. The system of claim 17, further comprising means for determining whether the requested service is allowed based on a service level agreement for the mobile unit.

22. The system of claim 17, further comprising means for generating a message requesting the mobile unit to degrade the requested service if sufficient bandwidth is not available.

23. The system of claim 17, further comprising means for determining whether degradation of another service is allowed if there is not sufficient bandwidth for the requested service.

24. The system of claim 17, further comprising means for generating a message indicating that degradation is available if degradation is allowed.

25. A method for managing wireless bandwidth resources, comprising:
    determining at a mobile unit that an associated application desires a service;
    generating a message requesting approval for the service, the message containing traffic characteristics for the service;
    receiving a message regarding approval;
    determining whether the service is approved, wherein the approval is based on the availability of wireless bandwidth and on current wireless bandwidth used by the mobile unit; and
    updating traffic information for a wireless link if the service is approved, wherein generating a message requesting approval for the service includes sending the message out-of-band, and wherein the message is sent out-of-band by inserting the message into the vendor-specific extension of an agent solicitation message.

26. The method of claim 25, further comprising:
    determining whether sufficient bandwidth is available for the service; and
    generating a rejection message if sufficient bandwidth is not available.

27. The method of claim 25, further comprising:
    determining whether degradation is allowed if the service is not approved; and
    generating a message requesting approval for the service if degradation is allowed.

28. The method of claim 25, wherein the message requesting approval for the service further includes traffic characteristics for other services.

29. A system for managing wireless bandwidth resources, comprising:
    a computer-processable medium; and
    logic stored on the computer-processable medium, the logic operable to:
        determine at a mobile unit that an associated application desires a service;
        generate a message requesting approval for the service, the message containing traffic characteristics for the service;
        receive a message regarding approval;
        determine whether the service is approved, wherein the approval is based on the availability of wireless bandwidth and on current wireless bandwidth used by the mobile unit; and
        update traffic information for a wireless link if the service is approved, wherein generating a message requesting approval for the service includes sending the message out-of-band, and wherein the message is sent out-of-band by inserting the message into the vendor-specific extension of an agent solicitation message.

30. The system of claim 29, wherein the logic is further operable to:
    determine whether sufficient bandwidth is available for the service; and
    generate a rejection message if sufficient bandwidth is not available.

31. The system of claim 29, wherein the logic is further operable to:
    determine whether degradation is allowed if the service is not approved; and
    generate a message requesting approval for the service if degradation is allowed.

32. The system of claim 29, wherein the message requesting approval for the service further includes traffic characteristics for other services.

33. A system for managing wireless bandwidth resources, comprising:
    means for determining at a mobile unit that an associated application desires a service;
    means for generating a message requesting approval for the service, the message containing traffic characteristics for the service;
    means for receiving a message regarding approval;
    means for determining whether the service is approved, wherein the approval is based on the availability of wireless bandwidth and on current wireless bandwidth used by the mobile unit; and
    means for updating traffic information for a wireless link if the service is approved, wherein generating a message requesting approval for the service includes sending the message out-of-band, and wherein the message is sent out-of-band by inserting the message into the vendor-specific extension of an agent solicitation message.

34. The system of claim 33, further comprising:
    means for determining whether sufficient bandwidth is available for the service; and
    means for generating a rejection message if sufficient bandwidth is not available.

35. The system of claim 33, further comprising:
    means for determining whether degradation is allowed if the service is not approved; and
    means for generating a message requesting approval for the service if degradation is allowed.

36. The system of claim 33, wherein the message requesting approval for the service further includes traffic characteristics for other services.

37. The system of claim 33, wherein generating a message requesting approval for the service includes sending the message out-of-band.

38. The system of claim 37, wherein the message is sent out-of-band by inserting the message into the vendor-specific extension of an agent solicitation message.

39. A mobile unit for managing wireless bandwidth resources, comprising:
    a service application manager operable to determine that an associated application desires a service, generate a message requesting approval for the service, the message containing traffic characteristics for the service, receive a message regarding approval, and determine whether the service is approved, wherein the approval is based on the availability of wireless bandwidth and on current wireless bandwidth used by the mobile unit; and a traffic manager operable to update traffic information for a wireless link if the service is approved, wherein generating a message requesting approval for the service includes sending the message out-of-band, and wherein the message is sent out-of-band by inserting the message into the vendor-specific extension of an agent solicitation message.

40. The mobile unit of claim 39, wherein the service application manager is further operable to:

determining whether sufficient bandwidth is available for the service; and generating a rejection message if sufficient bandwidth is not available.

41. The mobile unit of claim 39, wherein the service application manager is further operable to:

determine whether degradation is allowed if the service is not approved; and generate a message requesting approval for the service if degradation is allowed.

42. The mobile unit of claim 39, wherein the message requesting approval for the service further includes traffic characteristics for other services.

* * * * *